(12) United States Patent
Yaegashi

(10) Patent No.: US 11,550,212 B2
(45) Date of Patent: Jan. 10, 2023

(54) ROOM

(71) Applicant: NITTO DENKO CORPORATION, Ibaraki (JP)

(72) Inventor: Masahiro Yaegashi, Ibaraki (JP)

(73) Assignee: NITTO DENKO CORPORATION, Ibaraki (JP)

(*) Notice: Subject to any disclaimer, the term of this patent is extended or adjusted under 35 U.S.C. 154(b) by 9 days.

(21) Appl. No.: 17/047,801

(22) PCT Filed: Apr. 3, 2019

(86) PCT No.: PCT/JP2019/014783
§ 371 (c)(1),
(2) Date: Oct. 15, 2020

(87) PCT Pub. No.: WO2019/202988
PCT Pub. Date: Oct. 24, 2019

(65) Prior Publication Data
US 2021/0141300 A1    May 13, 2021

(30) Foreign Application Priority Data

Apr. 16, 2018    (JP) .............................. JP2018-078449

(51) Int. Cl.
G03B 21/604    (2014.01)
E06B 9/24    (2006.01)
G02B 5/30    (2006.01)

(52) U.S. Cl.
CPC .............. *G03B 21/604* (2013.01); *E06B 9/24* (2013.01); *G02B 5/3025* (2013.01); *E06B 2009/2417* (2013.01)

(58) Field of Classification Search
CPC . G03B 21/604; E06B 9/24; E06B 2009/2417; G02B 5/3025; G02B 5/305; E04H 3/22
(Continued)

(56) References Cited

U.S. PATENT DOCUMENTS 5,287,130 A    2/1994    Umeda
5,444,570 A *  8/1995    Uetsuki ................ G02B 5/3025
                                             359/485.05
(Continued)

FOREIGN PATENT DOCUMENTS

JP    63-064483 A    3/1988
JP    1-191824 A    8/1989
(Continued)

OTHER PUBLICATIONS

International Search Report dated Jun. 11, 2019, issued in counterpart application No. PCT/JP2019/014783, w/English translation (4 pages).
(Continued)

*Primary Examiner* — Christopher E Mahoney
(74) *Attorney, Agent, or Firm* — WHDA, LLP

(57) ABSTRACT

The room includes: a ceiling; a floor; and a wall having a pair of wall surfaces opposite to each other, and another pair of wall surfaces opposite to each other in a direction intersecting the pair of wall surfaces. One of the pair of wall surfaces and the other pair of wall surfaces has a window. The wall surface opposite to the wall surface having the window has arranged thereon a first screen. An inner side of the window, and a projection-side surface of the first each has arranged thereon a polarizing plate. An absorption axis direction of a polarizer of the polarizing plate of the window, and an absorption axis direction of a polarizer of the polarizing plate of the first screen and/or an absorption axis direction of a polarizer of the polarizing plate of the second screen are substantially perpendicular or parallel to each other.

7 Claims, 3 Drawing Sheets

(58) Field of Classification Search
USPC .......................................................... 359/449
See application file for complete search history.

(56) References Cited

U.S. PATENT DOCUMENTS

| | | | |
|---|---|---|---|
| 6,747,708 | B2 | 6/2004 | Taniai et al. |
| 8,982,459 | B1* | 3/2015 | Coley .................... G03B 35/24 |
| | | | 359/458 |
| 9,547,112 | B2* | 1/2017 | Mead ....................... G02B 5/20 |
| 9,772,549 | B2 | 9/2017 | Candry et al. |
| 2001/0052947 | A1 | 12/2001 | Taniai et al. |
| 2012/0212812 | A1* | 8/2012 | Weber .................. G03B 21/604 |
| | | | 359/454 |

FOREIGN PATENT DOCUMENTS

| | | | | |
|---|---|---|---|---|
| JP | 5-134214 | A | 5/1993 | |
| JP | 5-204046 | A | 8/1993 | |
| JP | 6-075303 | A | 3/1994 | |
| JP | H06130223 | A * | 5/1994 | .......... G03B 21/604 |
| JP | 6-167745 | A | 6/1994 | |
| JP | 9-106008 | A | 4/1997 | |
| JP | 9-211733 | A | 8/1997 | |
| JP | 2001-346219 | A | 12/2001 | |
| JP | 2003-186106 | A | 7/2003 | |
| JP | 2012-023494 | A | 2/2012 | |
| JP | 2013-109183 | A | 6/2013 | |
| JP | 2017-015897 | A | 1/2017 | |
| JP | 2017-111432 | A | 6/2017 | |

OTHER PUBLICATIONS

Extended European Search Report dated Dec. 10, 2021, issued in counterpart European Application No. 19789077.5 (in English; 7 pages).

* cited by examiner

ROOM

TECHNICAL FIELD

The present invention relates to a room. More specifically, the present invention relates to a room in which an image from a projector can be suitably projected.

BACKGROUND ART

An image projected by a projector is generally dark as compared to an image displayed by an image display apparatus, and hence is liable to be affected by ambient light. Therefore, an adjustment to a projection environment, such as darkening of a room, is required. As a matter of course, there is a demand for a projector capable of clearly displaying a projected image even under a bright environment. From such viewpoint, various investigations have been made on the projector, but the projector still has need for consideration.

CITATION LIST

Patent Literature

[PTL 1] JP 2013-109183 A
[PTL 2] JP 2012-023494 A
[PTL 3] JP 2001-346219 A

SUMMARY OF INVENTION

Technical Problem

The present invention has been made to solve the conventional problem, and an object of the present invention is to provide a room in which a projector-projected image having high contrast can be achieved even under a bright environment.

Solution to Problem

According to an embodiment of the present invention, there is provided a room. The room includes: a ceiling; a floor; and a wall having a pair of wall surfaces opposite to each other, and another pair of wall surfaces opposite to each other in a direction intersecting the pair of wall surfaces, the room being defined by the ceiling, the floor, and the wall. One of the pair of wall surfaces and the another pair of wall surfaces has a window. The wall surface opposite to the wall surface having the window has arranged thereon a first screen, and/or the wall surface on an opposite side in a lower culmination direction has arranged thereon a second screen. An inner side of the window, and a projection-side surface of the first screen and/or a projection-side surface of the second screen each have arranged thereon a polarizing plate. An absorption axis direction of a polarizer of the polarizing plate of the window, and an absorption axis direction of a polarizer of the polarizing plate of the first screen and/or an absorption axis direction of a polarizer of the polarizing plate of the second screen are substantially perpendicular or parallel to each other.

In one embodiment of the present invention, the absorption axis direction of the polarizer of the polarizing plate of the window is a direction substantially parallel to a vertical direction.

In one embodiment of the present invention, the polarizing plate of the window, and the polarizing plate of the first screen and/or the polarizing plate of the second screen each further have a retardation layer having an in-plane retardation $Re(550)$ of from 100 nm to 200 nm, and each have a circular polarization or elliptical polarization function.

According to another aspect of the present invention, there is provided a polarizing plate set. The polarizing plate set includes a first polarizing plate arranged on an inner side of a window arranged on one wall surface of a room; and a second polarizing plate arranged on a projection-side surface of a first screen arranged on a wall surface opposite to the wall surface having the window and/or a third polarizing plate arranged on a projection-side surface of a second screen arranged on a wall surface on an opposite side in a lower culmination direction. The first polarizing plate is arranged on the window, and the second polarizing plate is arranged on the first screen and/or the third polarizing plate is arranged on the second screen so that an absorption axis direction of a polarizer of the first polarizing plate, and an absorption axis direction of a polarizer of the second polarizing plate and/or an absorption axis direction of a polarizer of the third polarizing plate are substantially perpendicular or parallel to each other.

In one embodiment of the present invention, the first polarizing plate, and the second polarizing plate and/or the third polarizing plate each further have a retardation layer having an in-plane retardation $Re(550)$ of from 100 nm to 200 nm, and each have a circular polarization or elliptical polarization function.

Advantageous Effects of Invention

According to the embodiment of the present invention, the screens are arranged in specific positional relationships with respect to the window that sunlight enters. In addition, the polarizing plates (in one embodiment, the circularly polarizing plates or the elliptically polarizing plates) are arranged on the inner side of the window and the projection-side surfaces of the screens, and the absorption axis direction of the polarizer of the polarizing plate of the window and the absorption axis direction of the polarizer of the polarizing plate of each of the screens are made substantially perpendicular or parallel to each other. Accordingly, there can be provided the room in which a projector-projected image having high contrast can be achieved even under a bright environment.

DESCRIPTION OF EMBODIMENTS

Embodiments of the present invention are described below. However, the present invention is not limited to these embodiments. As used herein, the expressions "substantially perpendicular" and "approximately perpendicular" each encompass a case in which an angle formed by two directions is 90°±10°, and the angle is preferably 90°±7°, more preferably 90°±5°. The expressions "substantially parallel" and "approximately parallel" each encompass a case in which an angle formed by two directions is 0°±10°, and the angle is preferably 0°±7°, more preferably 0°±5°. Further, the simple expression "perpendicular" or "parallel" as used herein may include a substantially perpendicular or substantially parallel state. When an angle is mentioned herein, the angle encompasses both clockwise and counterclockwise angles with respect to a reference direction. In addition, when reference is made to the terms "east", "west", "south", and "north" herein, these terms mean not true azimuths with respect to a meridian but socially accepted directions concerning houses and residences.

Figure 1:
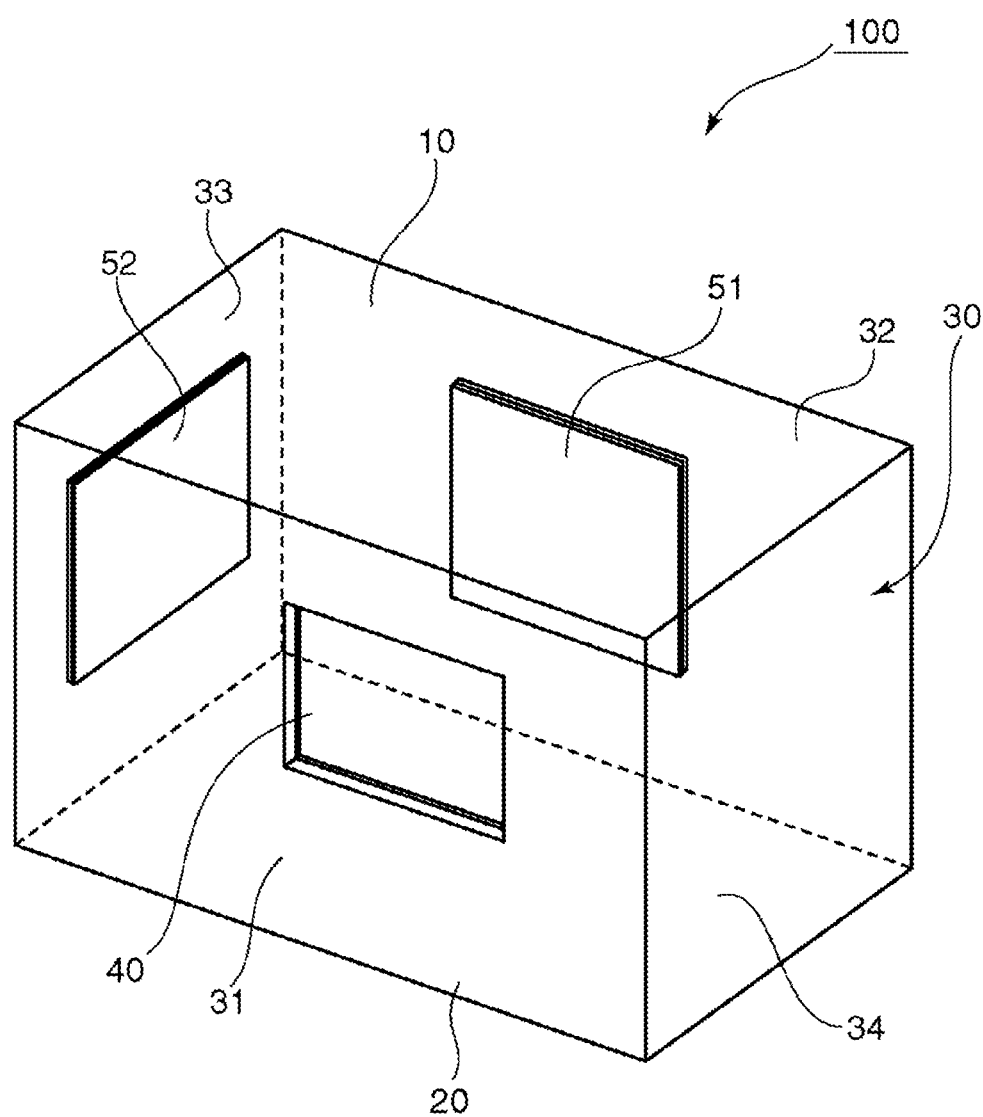
FIG. 1 is a schematic exploded perspective view of a room according to one embodiment of the present invention.
Figure 2:
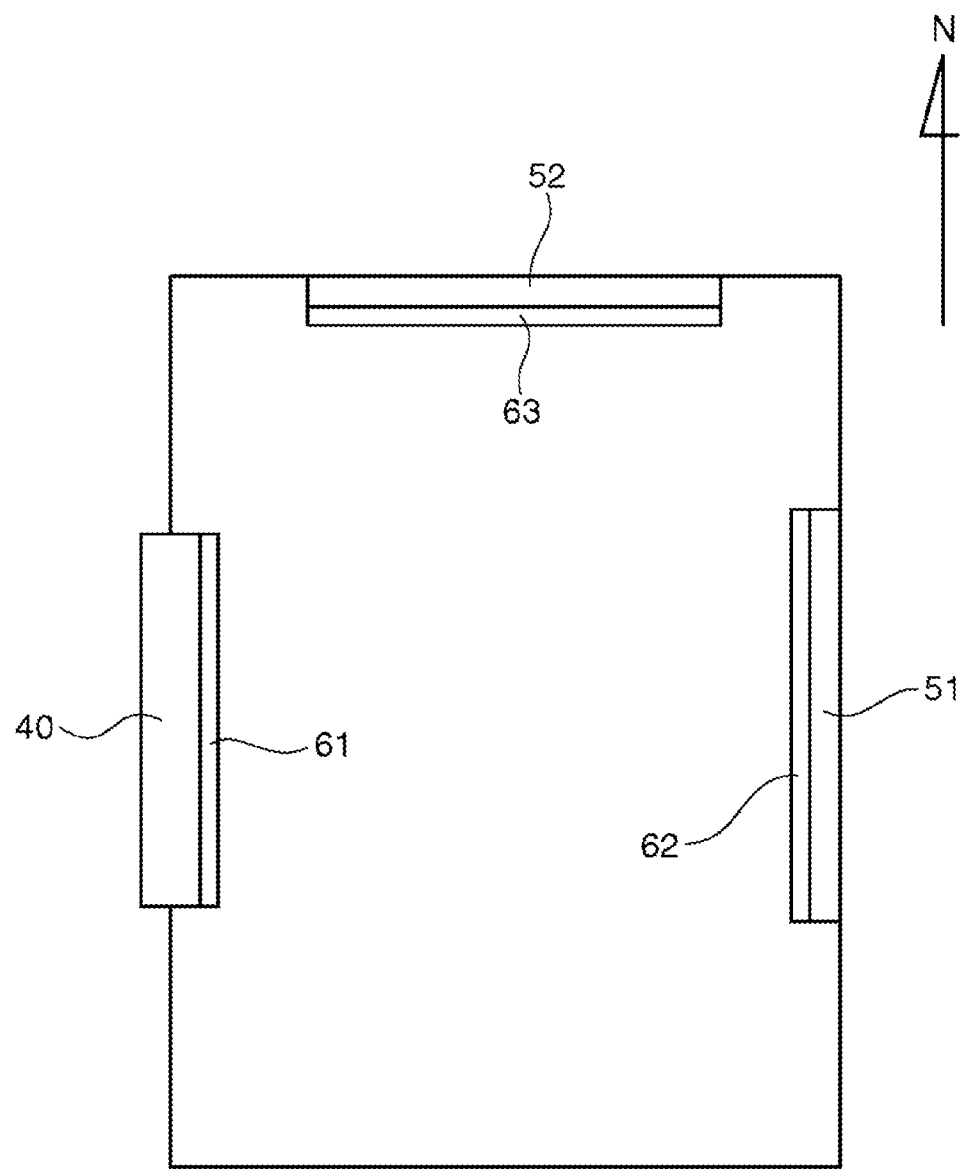
FIG. 2 is a schematic sectional view of the room of FIG. 1 when viewed from its ceiling side.

FIG. 1 is a schematic exploded perspective view of a room according to one embodiment of the present invention, and FIG. 2 is a schematic sectional view of the room of FIG. 1 when viewed from its ceiling side. A room 100 of the illustrated example is defined by a ceiling 10, a floor 20, and a wall 30. The wall 30 has a pair of wall surfaces 31 and 32 opposite to each other, and another pair of wall surfaces 33 and 34 opposite to each other in a direction intersecting the wall surfaces 31 and 32. An intersection angle between the wall surfaces 31 and 32, and the wall surfaces 33 and 34 may be set to any appropriate angle as long as a human being can live and lead a life. The wall surfaces 31 and 32, and the wall surfaces 33 and 34 are typically substantially perpendicular to each other like the illustrated example. One of the wall surfaces 31, 32, 33, and 34 (in the illustrated example, the wall surface 31) has a window 40. Further, in the illustrated example, a first screen 51 is arranged on the wall surface 32 opposite to the wall surface 31 having the window 40, and a second screen 52 is arranged on the wall surface 33. The wall surface 33 may be typically positioned on an opposite side in a lower culmination direction. In the illustrated example, the window 40 is arranged on a west side, the first screen 51 is arranged on an east side, and the second screen 52 is arranged on a north side. One of the first screen 51 and the second screen 52 may be omitted in accordance with, for example, purposes and the direction of the window. That is, in one embodiment, a projector-projected image having high contrast can be achieved even under a bright environment by omitting one of the first screen 51 and the second screen 52, that is, using only one screen; and in another embodiment, a projector-projected image having high contrast can be achieved even under a bright environment by performing projection through proper use of the first screen 51 and the second screen 52 in accordance with the incident direction of the sun (e.g., a season or a time). Herein, for ease of understanding, a case in which both of the first screen 51 (a second polarizing plate 62) and the second screen 52 (a third polarizing plate 63) are arranged is described. As described above, however, one of those screens may be omitted.

In the embodiment of the present invention, a first polarizing plate 61 is arranged on the inner side (room side) of the window 40, the second polarizing plate 62 is arranged on the projection-side surface of the first screen 51, and the third polarizing plate 63 is arranged on the projection-side surface of the second screen 52. The first polarizing plate, the second polarizing plate, and the third polarizing plate are hereinafter sometimes collectively simply referred to as "polarizing plates". The polarizing plates each typically have a polarizer and a protective film arranged on one side, or each of both sides, of the polarizer. The first polarizing plate, the second polarizing plate, and the third polarizing plate are typically bonded to the window 40, the first screen 51, and the second screen 52, respectively via pressure-sensitive adhesive layers. The absorption axis direction of the polarizer of the first polarizing plate 61, and the absorption axis direction of the polarizer of the second polarizing plate 62 and the absorption axis direction of the polarizer of the third polarizing plate 63 are substantially perpendicular or parallel to each other. The absorption axis direction of the polarizer of the first polarizing plate 61 may be set to any appropriate direction. For example, the absorption axis direction of the polarizer of the first polarizing plate 61 may be a direction substantially parallel to a vertical direction, may be a direction substantially parallel to a horizontal direction, or may be a direction forming a predetermined angle with respect to the vertical direction or the horizontal direction. In one embodiment, the absorption axis direction of the polarizer of the first polarizing plate 61 is a direction substantially parallel to the vertical direction. Therefore, in this embodiment, the absorption axis direction of the polarizer of the second polarizing plate 62 and the absorption axis direction of the polarizer of the third polarizing plate 63 are directions substantially parallel to the horizontal direction or the vertical direction, respectively. The combination of such polarizing plates is one feature of the embodiment of the present invention, and hence the embodiment of the present invention also comprehends such polarizing plate set.

Any appropriate configuration may be adopted for each of the polarizers and protective films of the polarizing plates.

Each of the polarizers may be an absorptive polarizer, may be a reflective polarizer, or may have a laminated structure of the absorptive polarizer and the reflective polarizer.

The absorptive polarizer (hereinafter sometimes simply referred to as "polarizer") is typically a resin film having adsorbed and aligned thereon a dichroic substance (e.g., iodine). For example, the resin film for forming the absorptive polarizer may be a single-layer resin film, or may be a laminate of two or more layers.

Specific examples of the absorptive polarizer formed of a single-layer resin film include: a polarizer obtained by subjecting a hydrophilic polymer film, such as a polyvinyl alcohol (PVA)-based film, a partially formalized PVA-based film, or an ethylene-vinyl acetate copolymer-based partially saponified film, to dyeing treatment with a dichroic substance, such as iodine or a dichroic dye, and stretching treatment; and a polyene-based alignment film, such as a dehydration-treated product of PVA or a dehydrochlorination-treated product of polyvinyl chloride. A polarizer obtained by dyeing the PVA-based film with iodine and uniaxially stretching the resultant is preferably used because the polarizer is excellent in optical characteristics.

The dyeing with iodine is performed by, for example, immersing the PVA-based film in an aqueous solution of iodine. The stretching ratio of the uniaxial stretching is preferably from 3 times to 7 times. The stretching may be performed after the dyeing treatment, or may be performed while the dyeing is performed. In addition, the dyeing may be performed after the stretching has been performed. The PVA-based film is subjected to swelling treatment, crosslinking treatment, washing treatment, drying treatment, or the like as required. For example, when the PVA-based film is immersed in water to be washed with water before the dyeing, contamination or an antiblocking agent on the surface of the PVA-based film can be washed off. In addition, the PVA-based film is swollen and hence dyeing unevenness or the like can be prevented.

A specific example of the absorptive polarizer obtained by using a laminate is a polarizer obtained by using a laminate of a resin substrate and a PVA-based resin layer (PVA-based resin film) laminated on the resin substrate or a laminate of a resin substrate and a PVA-based resin layer formed on the resin substrate through application. The polarizer obtained by using the laminate of the resin substrate and the PVA-based resin layer formed on the resin substrate through application may be produced, for example, by: applying a PVA-based resin solution to the resin substrate; drying the solution to form the PVA-based resin layer on the resin substrate, to thereby provide the laminate of the resin substrate and the PVA-based resin layer; and stretching and dyeing the laminate to turn the PVA-based resin layer into the polarizer. In this embodiment, the stretching typically includes stretching of the laminate under a state in which the laminate is immersed in an aqueous solution of boric acid. Further, the stretching may further include in-air stretching of the laminate at high temperature (e.g., 95° C. or more) before the stretching in the aqueous solution of boric acid as required. The resultant laminate of the resin substrate and the polarizer may be used as it is (i.e., the resin substrate may be used as a protective layer for the polarizer). Alternatively, a product obtained as described below may be used: the resin substrate is peeled from the laminate of the resin substrate and the polarizer, and any appropriate protective layer in accordance with purposes is laminated on the peeling surface. Details of such method of producing the polarizer are described in, for example, JP 2012-73580 A, the description of which is incorporated herein by reference in its entirety.

The absorptive polarizer preferably shows absorption dichroism at any wavelength in the wavelength range of from 380 nm to 780 nm. The single layer transmittance of the absorptive polarizer is preferably from 42.0% to 46.0%, more preferably from 44.5% to 46.0%. The polarization degree of the absorptive polarizer is preferably 97.0% or more, more preferably 99.0% or more, still more preferably 99.9% or more.

The reflective polarizer has a function of transmitting polarized light in a specific polarization state (polarization direction) and reflecting light in a polarization state other than the foregoing. The reflective polarizer may be of a linearly polarized light separation type, or may be of a circularly polarized light separation type. A linearly polarized light separation-type reflective polarizer is simply described below as an example. A circularly polarized light separation-type reflective polarizer is, for example, a laminate of a film obtained by fixing a cholesteric liquid crystal and a λ/4 plate.

Figure 3:
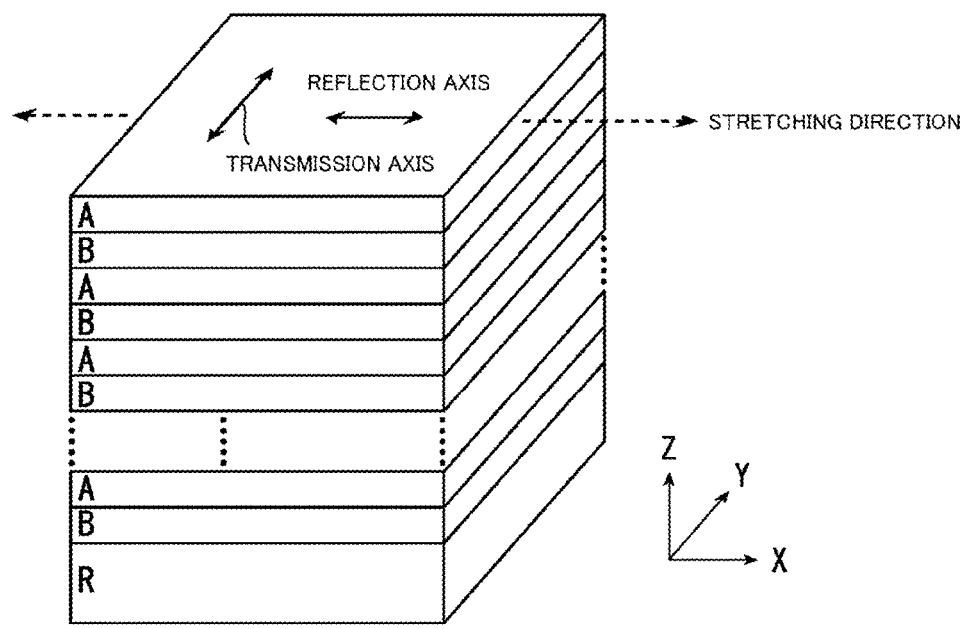
FIG. 3 is a schematic perspective view of an example of a reflective polarizer that may be used in the room according to the embodiment of the present invention.

FIG. 3 is a schematic perspective view of an example of the reflective polarizer. The reflective polarizer is a multilayer laminate in which a layer A having a birefringent property and a layer B substantially free of any birefringent property are alternately laminated. The total number of the layers of such multilayer laminate may be, for example, from 50 to 1,000. In the illustrated example, the refractive index nx of the layer A in an x-axis direction is larger than the refractive index ny thereof in a y-axis direction, and the refractive index nx of the layer B in the x-axis direction and the refractive index ny thereof in the y-axis direction are substantially equal to each other. Therefore, a difference in refractive index between the layer A and the layer B is large in the x-axis direction, and is substantially zero in the y-axis direction. As a result, the x-axis direction serves as a reflection axis, and the y-axis direction serves as a transmission axis. The difference in refractive index between the layer A and the layer B in the x-axis direction is preferably from 0.2 to 0.3. The x-axis direction corresponds to the stretching direction of the reflective polarizer in a method of producing the reflective polarizer. In addition, the reflective polarizer may include a reflective layer R as an outermost layer like the illustrated example.

The layer A preferably includes a material that expresses a birefringent property when stretched. Typical examples of such material include naphthalenedicarboxylic acid polyester (e.g., polyethylene naphthalate), polycarbonate, and an acrylic resin (e.g., polymethyl methacrylate). Of those, polyethylene naphthalate is preferred. The layer B preferably includes a material that is substantially free from expressing a birefringent property even when stretched. Such material is typically, for example, a copolyester of naphthalenedicarboxylic acid and terephthalic acid.

A polarizer described in, for example, JP 09-507308 A may be used as the reflective polarizer. In addition, a commercial product may be used as it is as the reflective polarizer, or the commercial product subjected to secondary processing (e.g., stretching) may be used. Examples of the commercial product include a product available under the product name "DBEF" from 3M Company, and a product available under the product name "APF" from 3M Company.

Any appropriate resin film that may be used as a protective film for the polarizer may be adopted as the protective film. As a material serving as a main component of the film, there are specifically given, for example, cellulose-based resins, such as triacetylcellulose (TAC), and transparent resins, such as polyester-based, polyvinyl alcohol-based, polycarbonate-based, polyamide-based, polyimide-based, polyether sulfone-based, polysulfone-based, polystyrene-based, polynorbornene-based, polyolefin-based, (meth) acrylic, and acetate-based resins. There are also given, for example, thermosetting resins or UV-curable resins, such as (meth)acrylic, urethane-based, (meth)acrylic urethane-based, epoxy-based, and silicone-based resins. There are also given, for example, glassy polymers, such as a siloxane-based polymer. In addition, a polymer film described in JP 2001-343529 A (WO 01/37007 A1) may be used. For example, a resin composition containing a thermoplastic resin having a substituted or unsubstituted imide group on a side chain thereof, and a thermoplastic resin having a substituted or unsubstituted phenyl group and a nitrile group on side chains thereof may be used as a material for the film, and the composition is, for example, a resin composition containing an alternating copolymer formed of isobutene and N-methylmaleimide, and an acrylonitrile-styrene copolymer. The polymer film may be, for example, an extrudate of the resin composition.

When the protective film is arranged on the surface side of each of the polarizing plates (in the first polarizing plate, a side opposite to the window, and in each of the second and third polarizing plates, a side opposite to the screen), a viewer-side protective film may be subjected to surface treatment, such as hard coat treatment, antireflection treatment, anti-sticking treatment, or antiglare treatment, as required.

When the protective film is arranged on the inner side of each of the polarizing plates (in the first polarizing plate, a window side, and in each of the second and third polarizing plates, a screen side), an inner protective film is preferably optically isotropic. The phrase "optically isotropic" as used herein means that the layer has an in-plane retardation Re(550) of from 0 nm to 10 nm and a thickness direction retardation Rth(550) of from −10 nm to +10 nm. The symbol "Re(λ)" as used herein refers to an in-plane retardation measured at 23° C. with light having a wavelength of λ nm. For example, the symbol "Re(550)" refers to an in-plane retardation measured at 23° C. with light having a wavelength of 550 nm. The Re(λ) is determined from the equation "Re(λ)=(nx−ny)×d" when the thickness of a layer (film) is represented by d (nm). The symbol "Rth(λ)" refers to a thickness direction retardation measured at 23° C. with light having a wavelength of λ nm. For example, the symbol "Rth(550)" refers to a thickness direction retardation measured at 23° C. with light having a wavelength of 550 nm. The Rth(λ) is determined from the equation "Rth(λ)=(nx−nz)×d" when the thickness of a layer (film) is represented by d (nm). The symbol "nx" refers to a refractive index in a direction in which an in-plane refractive index is maximum (that is, slow axis direction), the symbol "ny" refers to a refractive index in a direction perpendicular to the slow axis in the plane (that is, fast axis direction), and the symbol "nz" refers to a refractive index in a thickness direction.

In one embodiment, the first polarizing plate, the second polarizing plate, and the third polarizing plate each further have a retardation layer having an in-plane retardation Re(550) of preferably from 100 nm to 200 nm. With such configuration, a circular polarization or elliptical polarization function may be imparted to each of the first polarizing plate, the second polarizing plate, and the third polarizing plate. The in-plane retardation Re(550) of the retardation layer is more preferably from 120 nm to 180 nm, still more preferably from 130 nm to 160 nm. The retardation layer may be typically arranged on the surface side of each of the polarizing plates (in the first polarizing plate, the side opposite to the window, and in each of the second and third polarizing plates, the side opposite to the screen). When the circular polarization function or the elliptical polarization function is imparted, precise adjustment of an angle between the absorption axis direction of the first polarizing plate, and the absorption axis direction of each of the second polarizing plate and the third polarizing plate is not required. For example, when perfect circularly polarized light can be achieved, the adjustment of the angle between the absorption axis direction of the first polarizing plate, and the absorption axis direction of each of the second polarizing plate and the third polarizing plate is not required.

The retardation layer preferably shows a refractive index characteristic of nx>ny≥nz. Therefore, the retardation layer has a slow axis. An angle formed by the absorption axis of the polarizer of each of the first polarizing plate, the second polarizing plate, and the third polarizing plate, and the slow axis of the retardation layer is preferably from 38° to 52°, more preferably from 42° to 48°, still more preferably about 45°.

The retardation layer may show such a reverse wavelength dispersion characteristic that its retardation value increases with an increase in wavelength of measurement light, may show such a positive wavelength dispersion characteristic that the retardation value reduces with an increase in wavelength of the measurement light, or may show such a flat wavelength dispersion characteristic that the retardation value remains substantially unchanged even when the wavelength of the measurement light is changed. When the retardation layer shows the reverse wavelength dispersion characteristic, a ratio Re(450)/Re(550) is preferably 0.85 or more and less than 1.00, more preferably 0.95 or more and less than 1.00; and a ratio Re(550)/Re(650) is preferably 0.90 or more and less than 1.00, more preferably 0.95 or more and less than 1.00. When the retardation layer shows the positive wavelength dispersion characteristic or the flat wavelength dispersion characteristic, the ratio Re(450)/Re(550) is preferably from 1.00 to 1.15, more preferably from 1.00 to 1.07; and the ratio Re(550)/Re(650) is preferably from 1.00 to 1.10, more preferably from 1.00 to 1.05.

The thickness of the retardation layer may be set so that the desired in-plane retardation is obtained. The thickness of the retardation layer is preferably from 20 μm to 100 μm, more preferably from 30 μm to 70 μm.

The retardation layer may be formed of any appropriate resin film capable of achieving the above-mentioned characteristics. Examples of the resin for forming the retardation layer include polyarylate, polyamide, polyimide, polyester, polyaryl ether ketone, polyamide imide, polyester imide, polyvinyl alcohol, polyfumaric acid ester, polyethersulfone, polysulfone, a norbornene resin, a polycarbonate resin, a cellulose resin, and polyurethane. Those resins may be used alone or in combination thereof. The retardation layer may be obtained by stretching a film formed from any one of those resins under conditions in accordance with the kind of the resin and the above-mentioned desired characteristics.

The room according to the embodiment of the present invention may be suitably used as a space for the projection of an image by a projector because the room enables clear display of the image projected by the projector even under a bright environment.

As described above, according to the embodiment of the present invention, an image projected by a projector can be displayed clearly (typically in high contrast) even under a bright environment not by improving the configuration of the projector itself but by appropriately designing a space for projector projection.

INDUSTRIAL APPLICABILITY

The room according to the embodiment of the present invention is expected to expand applications because the room enables clear display of the image projected by the projector even under a bright environment.

REFERENCE SIGNS LIST

10 ceiling
20 floor
30 wall
31, 32, 33, 34 wall surface
40 window
51 first screen
52 second screen
61 first polarizing plate
62 second polarizing plate
63 third polarizing plate
100 room

The invention claimed is:
1. A room, comprising:
a ceiling;
a floor; and
a wall having a pair of wall surfaces opposite to each other, and another pair of wall surfaces opposite to each other in a direction intersecting the pair of wall surfaces,
the room being defined by the ceiling, the floor, and the wall,
wherein one of the pair of wall surfaces and the another pair of wall surfaces has a window,
wherein the wall surface on an opposite side in a lower culmination direction has arranged thereon a second screen,
wherein an inner side of the window, and a projection-side surface of the second screen each have arranged thereon a polarizing plate, and
wherein an absorption axis direction of a polarizer of the polarizing plate of the window, and an absorption axis direction of a polarizer of the polarizing plate of the second screen are substantially perpendicular or parallel to each other.

2. The room according to claim 1, wherein the absorption axis direction of the polarizer of the polarizing plate of the window is a direction substantially parallel to a vertical direction.

3. The room according to claim 1, wherein the polarizing plate of the window, and the polarizing plate of the second screen each further have a retardation layer having an in-plane retardation Re(550) of from 100 nm to 200 nm, and each have a circular polarization or elliptical polarization function.

4. The room according to claim 1, wherein the wall surface opposite to the wall surface having the window has arranged thereon a first screen,
wherein a projection-side surface of the first screen has arranged thereon a polarizing plate,
wherein the absorption axis direction of the polarizer of the polarizing plate of the window, and an absorption axis direction of a polarizer of the polarizing plate of the first screen are substantially perpendicular or parallel to each other.

5. A polarizing plate set, comprising:
a first polarizing plate arranged on an inner side of a window arranged on one wall surface of a room; and
a third polarizing plate arranged on a projection-side surface of a second screen arranged on a wall surface on an opposite side in a lower culmination direction,
wherein the first polarizing plate is arranged on the window, and the third polarizing plate is arranged on the second screen so that an absorption axis direction of a polarizer of the first polarizing plate, and an absorption axis direction of a polarizer of the third polarizing plate are substantially perpendicular or parallel to each other.

6. The polarizing plate set according to claim 5, wherein the first polarizing plate, and the third polarizing plate each further have a retardation layer having an in-plane retardation Re(550) of from 100 nm to 200 nm, and each have a circular polarization or elliptical polarization function.

7. The polarizing plate set according to claim 5, further comprising:
a second polarizing plate arranged on a projection-side surface of a first screen arranged on a wall surface opposite to the wall surface having the window,
wherein the second polarizing plate is arranged on the first screen so that the absorption axis direction of the polarizer of the first polarizing plate, and an absorption axis direction of a polarizer of the second polarizing plate are substantially perpendicular or parallel to each other.

* * * * *